Dec. 12, 1939.   F. S. MISTERLY ET AL   2,183,244
TRANSMISSION SYSTEM
Filed July 30, 1932   2 Sheets-Sheet 1

INVENTORS
FRANK S. MISTERLY
SAMUEL B. SMITH
BY
ATTORNEY

Dec. 12, 1939.  F. S. MISTERLY ET AL  2,183,244
TRANSMISSION SYSTEM
Filed July 30, 1932   2 Sheets-Sheet 2
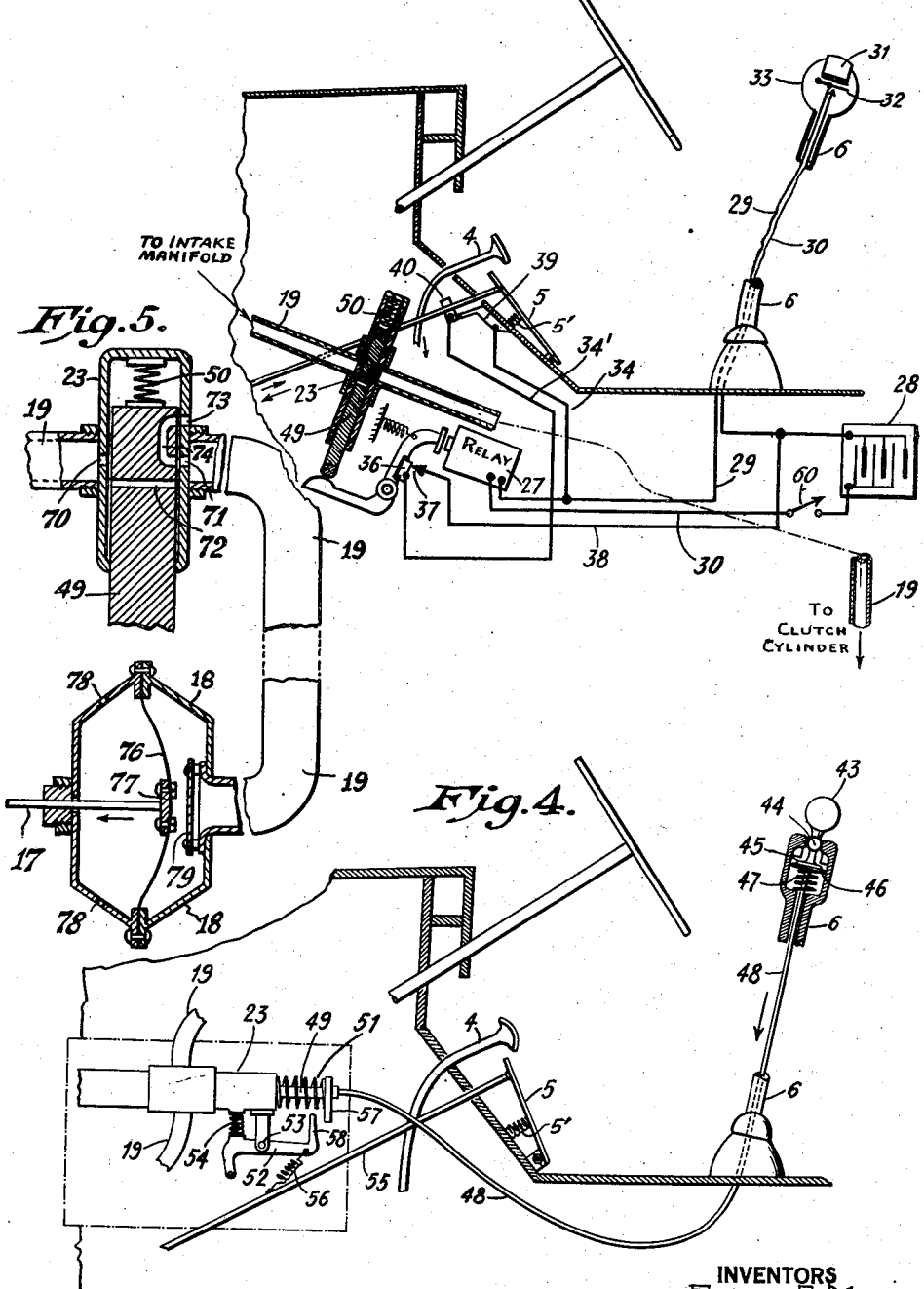
INVENTORS
FRANK S. MISTERLY
SAMUEL B. SMITH
BY
*Samuel B. Smith*
ATTORNEY Patented Dec. 12, 1939

2,183,244

UNITED STATES PATENT OFFICE 2,183,244

TRANSMISSION SYSTEM

Frank S. Misterly, Darien, Conn., and Samuel B. Smith, Hartsdale, N. Y.

Application July 30, 1932, Serial No. 627,016

24 Claims. (Cl. 192—.01)

The present invention relates to motor vehicles and more particularly to novel gear shifting and clutch operating mechanisms therefor.

In the art as known at present, there are employed so-called selective free-wheeling and selective automatic clutch operating means. With the former type means gear shifting without depressing the clutch pedal is possible in all forward speeds, except when starting, whereas, with the latter type means suggested above, manual operation of the clutch pedal is entirely eliminated.

In both of the systems named above certain disadvantages are present. For instance, in the so-called "free-wheeling" type of drive the clutch pedal must be operated or depressed before the car can be started, whereas, in the "automatic clutch" type operation of the clutch mechanism with each release of the accelerator pedal causes unnecessary wear on the bearings and clutch face by continually causing the clutch plates to move between engaged and disengaged positions.

It is also a fact that in both of the above-named systems the clutch mechanism must be operated whenever the systems, which, as above pointed out, are selective, are rendered inoperative as, for instance, when it is desired to utilize the braking action of the engine.

It is an object of the present invention to provide means which when incorporated in a motor vehicle in conjunction with ordinary "free-wheeling" type of transmission results in a system that completely eliminates all of the disadvantages of the above systems and yet retains all of their advantages.

A further object of the invention is to provide a clutch operating means or mechanism which is rendered selectively operative only at time periods when a change in the transmission gear ratio is desired, that is, when changing between low, intermediate, or high gear, as well as reverse gear.

An additional object of the present invention is to provide a control system for motor vehicles which will serve to operate to disengage the plates of the clutch mechanism used to link the driving and driven members automatically upon each desired shift in the selected operative transmission gears and then automatically cause the clutch plates to re-engage at a time immediately subsequent to the completion of any gear selection, provided the throttle is opened to increase the engine speed to a degree to cause the vehicle to accelerate.

Still a further object of the invention is to provide an automatic clutch operating mechanism, which may be of a mechanical, electrical, hydraulic or other suitable type, capable of becoming operative automatically by an advance in the throttle position only provided a change in the selected gear ratio has been established in the time period immediately prior to the time of opening the throttle, or at a time which is the time of first advance of the throttle after completing a change in the selected gearing.

Briefly, the present invention provides an engine vacuum operated clutch engaging and disengaging mechanism operated by movements of the gear shifting lever. The arrangement is preferably such that movement of the shifting lever for gear shifting purposes will first operate to disengage the clutch and the clutch operating means will tend to maintain the clutch disengaged until after the completion of the gear shifting operation. The mechanism is related to the throttle control or accelerator pedal in such a manner that the clutch is prevented from re-engaging after the shifting operation if the accelerator pedal is in a released position, that is, for example, when the engine is idling. The clutch becomes engaged when the accelerator is depressed and the throttle opened, after which, unless the gear shifting mechanism is again operated, it remains engaged even though the accelerator is released.

In another modification, the clutch operating mechanism is controlled by the operator from a button placed on the shifting lever or elsewhere, as desired, and this button must be depressed by the operator before shifting gears. In this case also, the clutch does or does not re-engage after the shifting operation depending upon whether or not the throttle control or accelerator is released while shifting. That is to say, if the throttle control or accelerator is released the clutch engages only when the accelerator is depressed again, whereas, if the accelerator is maintained depressed below the idling position the clutch will re-engage at the completion of the shifting operation or more accurately when the operator releases the clutch operating button.

With the present invention incorporated in motor vehicles the clutch pedal need never be operated by the foot of the driver since means are provided for automatically operating the clutch prior to shifting and irrespective of the condition of the "free-wheeling" unit when such a unit is employed.

Also, with the present invention means are provided whereby the vehicle may be placed in any gear and if this operation is performed while the accelerator pedal is released the clutch will not re-engage again until the accelerator pedal is depressed. However, once the accelerator pedal is depressed, releasing it again will not operate the clutch mechanism. Hence, unless the "free-wheeling" unit is in operation with the drive unit, the engine will act as a brake. In other words, the invention provides means whereby the clutch mechanism is affected by the accelerator pedal only once after each gear shift and then only in the sense that it prevents the engagement of the clutch mechanism until the accelerator pedal is depressed. Furthermore, the accelerator pedal is in a position to affect the clutch mechanism as pointed out above only when it is released during the gear shifting operation. It is seen, therefore, that the clutch will be re-engaged immediately after shifting gears if the accelerator pedal is not released during the shifting operation.

One of the great advantages of the present invention is the fact that the operator may without thought of the clutch mechanism shift into any one of the forward speeds, or into reverse, while the vehicle is at a standstill and the vehicle will not move until the accelerator is depressed, at which time the clutch becomes re-engaged.

The invention provides means for rendering the system inoperative so that the vehicle is operative only in the conventional manner. This is found desirable for the reason that, so far as applicants are aware, no way has yet been devised which is entirely satisfactory to maneuver a vehicle in and out of the so-called "tight" places than by, so to speak, "slipping the clutch" to control the movement of the vehicle without rigid dependence upon the speed of the motor.

Other objects and features of the present invention will be apparent and at once suggest themselves to those skilled in this art by reading the following detailed specification of the invention in connection with the accompanying drawings, wherein:

Fig. 3 is a diagrammatic showing of a suitable form of the invention;

Fig. 4 is a modification of the arrangement shown by Fig. 3; and,

Fig. 5 is an enlarged view of certain parts of the valve and fluid motor.

Figure 1:
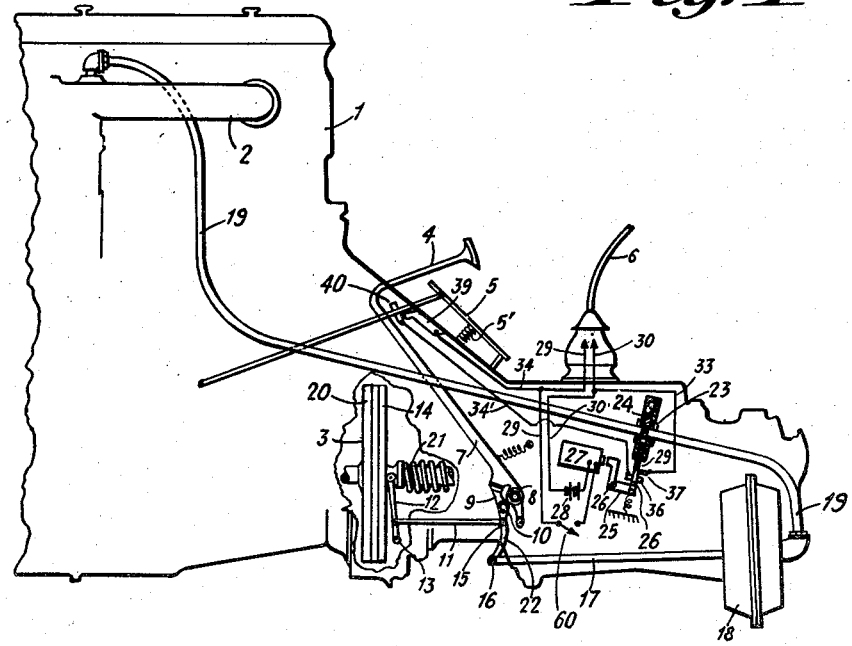
Fig. 1 is a schematic showing of a portion of an automobile to which the present invention is applied and shows the clutch mechanism in its engaged position.

To make reference now to the drawings for a further description of the invention, in Fig. 1 there is shown a portion of the usual gasoline engine 1 customarily used in motor vehicles. The engine 1 has associated therewith the usual intake manifold 2, the clutch mechanism 3, the the clutch operating pedal 4, accelerator or throttle control 5 which is arranged to be depressed or operated against a returning force exerted by a spring 5', and a gear shifting lever 6 which connects with the transmission gears (not shown).

The clutch pedal 4 is provided with a long stem or arm 7 which is pivoted at the point 8. The clutch 3 includes a movable plate, disk, or face portion 14 adapted to cooperate in frictional engagement with a similar member 20, which is fixed insofar as longitudinal motion is concerned,
in well known manner for connecting the driving member with the driven member of the vehicle. As is customary the movable clutch plate 14 is adapted to be shifted along a splined shaft 21 by a suitable system of levers and springs each time the clutch operating pedal 4 is depressed. A suitable system of links and levers for this purpose is shown by the members 12, 11, 9, and 7. Lever 9 is pivoted at 10 and has connected to it one end of link 11. The other end of link 11 is connected to lever 12 which is suitably pivoted at the point 13.

Downward movement of the clutch operating pedal 4 causes a counter-clockwise rotation of the arm 7 about the pivot 8 and produces a rotation, in a sense, of lever 9 about the pivot point 10. This movement of the lever 9 causes a movement of link 11 to the right which, in turn, causes a clockwise rotation of lever 12 about pivot point 13 and a consequent disengagement of the movable clutch face or plate 14 from the face or plate member 20. Releasing pedal 4 causes the clutch faces or plates 14 and 20 to become re-engaged in a manner which is readily apparent from a consideration of the several figures of the drawings.

Figure 2:
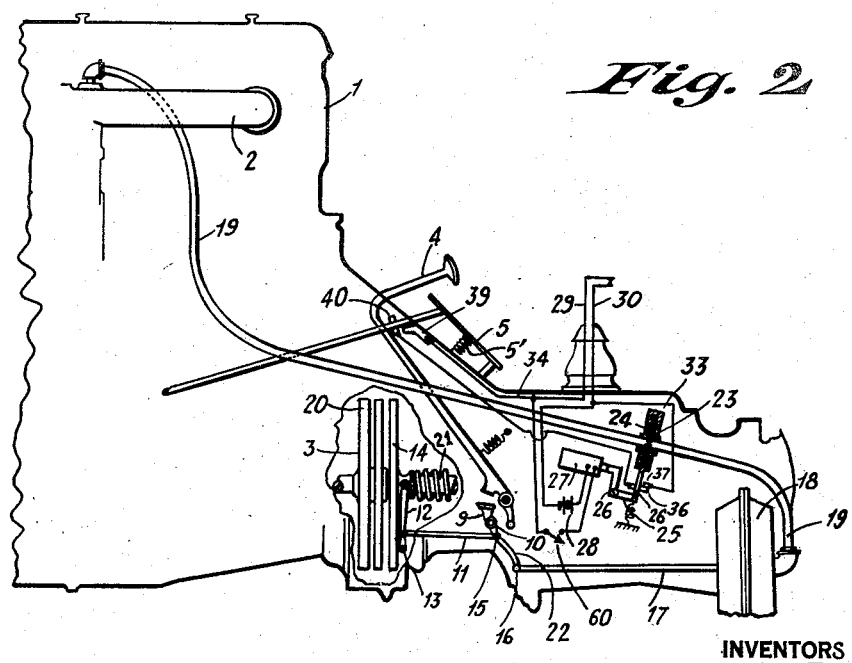
Fig. 2 is a schematic diagram like Fig. 1 except that it shows the clutch mechanism in its disengaged position.

Lever 9 is provided with a depending portion 22 to the end of which is pivoted one end of a link 17, the other end of which is suitably associated with a diaphragm 76 (see Fig. 5) contained within the engine vacuum operating fluid motor means 18. As shown, the fluid motor 18 is connected by a pipe line 19 to the intake manifold 2. In the vacuum line formed by pipe 19 a valve mechanism 23 is positioned in such manner that when the valve 23 is open and the engine is delivering power, or is even idling, a vacuum is created in the pipe line 19. The created vacuum when valve 23 is open causes the diaphragm within the vacuum operated means to move to the right (see Fig. 5) with a result that link 17 also moves to the right, as shown in Fig. 2, so as thereby to cause the fixed and movable disks or plates 20 and 14 of the clutch 3 to become disengaged.

On the other hand whenever valve 23 in the vacuum line 19 is closed the vacuum created in the intake manifold 2 will no longer be effective to operate the clutch mechanism 3 and the clutch plates or disks 14 and 20 will re-engage through the action of the usual clutch spring. In the re-engaged position of the clutch plates or disks power is transferred from the driving member, that is the engine, to the driven members, that is the wheels of the vehicle.

Considering Fig. 5 more fully, it will be seen that valve 23 is provided with a suitable cylinder within which the piston 49 slides. When piston 49 is raised from the position shown, openings 70, 72 and 71 are in alignment and the engine suction causes diaphragm 76 to be moved to the right. Vents 78 in casing 18 allow air to flow in and out of the left chamber of 18 easily. A plate or stop 79 is provided to limit the movement of the diaphragm. When piston 49 is in the position shown, air is let into pipe 19 through openings 73, 74 and 71 thus allowing the clutch spring to return diaphragm 76 to the left. The drawings (Fig. 5) show the device just as piston 49 reaches the lower position and the vacuum is broken with the result that shaft 17 is moving as shown by the arrow.

For opening and closing the valve member 23 there is provided a sliding lever element 24 which is suitably connected to a pivoted armature 25.

Clockwise rotation of the armature 25 about its axis 26 closes the valve member 23, so that the vacuum created in the engine intake manifold 2 is ineffective to operate the vacuum operated means 18, whereas counter-clockwise rotation of the armature 25 tends to open the valve 23 to make the vacuum in the pipe line 19 effective to control the vacuum operated device 18. In order to operate the pivoted lever 25 there is provided a suitable cooperating electromagnet 27 which, when energized by battery 28, opens the valve 23 and thereby causes the plates 14 and 20 of the clutch 3 to become disengaged.

The energizing circuit for the electromagnet 27 includes the battery 28, which, preferably, may be the ordinary storage battery already present in motor vehicles, conductor 30, switch 32, the conductor 29 and switch 60.

As shown by Fig. 3, the two conductors 29 and 30 are led to the switch 32 through the shifting lever or stem 6 and a button 31 is suitably mounted upon the ball 33 at the upper end of the shifting lever 6 in such manner that when the button 31 is depressed, immediately upon commencing a gear shifting operation, it closes the switch 32 and thereby causes the electromagnet or solenoid 27 to become energized from the battery 28.

Switch 60 is provided so as to make it possible to render the automatic system inoperative should it be desired to do so. It is obvious, that opening switch 60 prevents operation of magnet 27 despite closure of switch 32.

It will be seen from what has preceded that when the button 31 is allowed to return to its normal position that switch 32, which is preferably spring pressed upwardly from the position shown, will open and consequently the relay 27 becomes de-energized so as thereby to allow the clutch plates or disks 14 and 20 of the clutch member 3 to re-engage. Under certain circumstances it is not desirable to have the clutch plates re-engage immediately after shifting gears or, in other words, immediately after the button 31 is released. For this purpose there is provided a shunt circuit for maintaining the relay 27 energized under certain conditions, to be hereinafter more specifically enumerated. The shunt circuit comprises the conductor 34, the contact member 39, the cooperating contact member 40, the conductor 34', the cooperating contacts 36 and 37, and the conductor 38, all of which may form a closed circuit including the battery 28 for energizing the relay 27. It should be noted that the contacts 36 and 37 are associated with the valve operating mechanism 24 and that these two contacts are closed only when the valve 23 is in its open position, as is shown by Fig. 2. Contacts 39 and 40 are, on the other hand, associated with the accelerator pedal 5 in such a manner that the two contacts are closed when the accelerator pedal 5 is released. It will be seen that if the clutch is disengaged, as when shifting gears, when the accelerator pedal is released, the clutch plates or disks 14 and 20 will not again re-engage until contacts between the elements 39 and 40 is broken by the depression of the accelerator pedal 5 so as to de-energize the relay 27 which holds the valve 23 open. Note should here be made of the fact that after the clutch mechanism 3 has thus become engaged releasing the accelerator pedal 5 will not cause the clutch plates 14 and 20 again to disengage, since the operation of the valve mechanism 24 breaks the contact between the elements 36 and 37 so as thereby to prevent the energization of the relay 27 except through the gear shifting mechanism.

By a modification of the invention, shown in Fig. 4, the principles defined in describing the electrical system of Figs. 1 and 2, and more particularly exemplified in the detailed showing of Fig. 3, also find application in a mechanical embodiment. In this modification of our invention we have arranged in the upper end of the shifting lever 6 a pivotal knob or ball 43 which is capable of being pivoted for movement throughout a full 360° in any direction by movement about a pivot point 44, which is preferably in the nature of a ball and socket joint. So arranged, movement in this manner would occur without thought on the part of the operator of the vehicle in making gear shifting operations so long as the upper end 43 of the shifting lever 6 is grasped at the time it is desired to make a shift in the selected gearing. As the ball or knob 43 is grasped and pivoted about the pivot point 44 it causes the plate-like member 45, located at the end thereof which is internal of the shifting lever 6, to depress the plate member 46 against the pressure of a spring 47.

Attached to the plate member 46, or even bearing against the lower surface thereof, is a flexible cable member 48 which passes downwardly through the shifting lever 6 to bear against the valve actuating piston 49 of the valve member 23. When the ball or knob 43 is grasped, and the cable 48 is thus moved downwardly in the direction shown by the arrow on Fig. 4, the valve 23 is opened so that the piston 49 opens the vacuum line 19 and permits the vacuum created at the intake manifold 2 to become effective to actuate the vacuum operated means 18 to disengage the clutch plates 14 and 20 of the clutch 3. This action takes place within the valve 23 against the pressure of the spring member 50, as in the arrangements shown by Figs. 1 to 3 inclusive, so that when pressure is exerted by the flexible cable member 48 against the valve piston 49 the valve opens, but when pressure is removed the springs 50 and 51 cause the valve to close automatically.

To provide an arrangement which is mechanically equivalent to the electrical means above described to hold the valve 23 open until the throttle is again depressed after the completion of a shifting operation we have shown a catch or claw member 52 which is pivoted to a fixed portion of the valve 23 at 53. The claw member 52 is normally urged in a counterclockwise manner by means of a compression spring member or other suitable device 54.

In Fig. 4 the accelerator pedal 5, which connects with the throttle operating lever 55, is shown in a position where it is partially depressed, which would be, in operation, a moderately slow engine speed. Connected with the throttle actuating lever 55 is a spring 56 which connects at its other end with the catch or claw member 52.

In this form of the invention it is clear that if a gear shifting operation takes place the flexible cable 48 will move to cause the valve actuating piston 49 to move to the left from the position shown, and this operation moves the detent 57 to the left from the position shown. If now the accelerator pedal 5 is in its released position so that the spring 56 connected with the throttle operating lever 55 does not work against the pressure of spring 54 the end 58 of the catch 52 will engage with the right hand side of the detent 57 to hold the valve 23 in an operative position irrespective of whether or not pressure upon the ball or knob 43 is released. Thus, the clutch plates 14 and 20, which as shown by Fig. 2 are disengaged when valve 23 is open, cannot re-engage. However, upon depressing the accelerator pedal 5 the spring member 56 will pull the catch 58 in a clockwise manner and permit the spring pressure exerted by the spring elements 50 and 51 to cause the valve 23 to close and thus permit the clutch plates 14 and 20 again to re-engage at a rate controlled by the selector valve 23a. As was the case with the electrical system of Figs. 1 to 3 inclusive, the further release of the accelerator pedal prior to a subsequent shifting operation will not affect in any way the clutch operation since the detent 57 is always, in the absence of a shifting operation to move it otherwise, moved to the right (as shown) from the position to which the catch 58 can move upon a release of the accelerator pedal.

From what has been said above it is clear that in shifting gears by the usual manual control of the gear shifting lever the sequence of the operations is such that upon initially grasping the upper end 33 of the shifting lever (Fig. 3) and depressing the button 31 or grasping the knob or ball 43 (Fig. 4) and moving it the clutch plates 14 and 20 are caused to disengage and following this operation it is possible to complete the shifting in the usual manner. It is the first of these two operations which has heretofore required, when using the so-called standard transmission, thought on the part of the operator and which, as hereinabove explained, is now automatically accomplished for the operator while in no way altering or changing the system of driving or control.

Many other and varied modifications of this invention will, of course, suggest themselves to those skilled in the art to which this invention is directed upon reading the above specification and considering the hereinafter appended claims and we, therefore, believe ourselves to be entitled to make and use any and all of these modifications and changes provided they fall fairly within the spirit and scope of our hereinafter appended claims.

Having now described our invention what we claim as new and novel and desire to protect by Letters Patent is the following:

1. In a motor driven vehicle, a driving means and a driven means, a clutch mechanism and a multi-step selective transmission system interposed between the driving and driven means and so arranged that, under certain conditions, the clutch mechanism must be disengaged prior to a selecting operation of the transmission system, a shifting lever for selecting any of the several steps of the transmission system, means connected with the shifting lever for causing the clutch mechanism to disengage upon operation of the shifting lever as when the shifting lever is shifted between any two of the plurality of positions thereof to select individual transmission steps and to cause the clutch mechanism to remain disengaged during the time periods when force is exerted upon the shift lever irrespective of the position thereof, means for controlling the speed of the driving means between idling and maximum speed, and means controlled by the speed control means for causing the clutch mechanism to re-engage after a completion of the selecting operation, in the absence of force applied to the shift lever, when the speed of the driving means is changed in the direction between idling and maximum.

2. The system described in claim 1 wherein the means for causing the clutch to re-engage also causes the operation of the clutch mechanism by the speed control means only once after each operation of the shifting means.

3. The system described in claim 1 wherein the means for causing the clutch to re-engage also renders effective the operation of the clutch mechanism, by the speed control means, to engage the clutch only when the speed control means is in the vicinity of the engine idling position at the time the shifting operation is completed.

4. The system claimed in claim 1 comprising, in addition, means to limit the operational control of the clutch mechanism by the speed controlling means to a single operation only subsequent to each transmission selection step irrespective of the position of the speed controlling means.

5. The system described in claim 1 wherein the means for causing the clutch to re-engage also causes the operation of the clutch mechanism by the speed control means only once after each operation of the shifting means said means being conditioned to control the operation of the clutch mechanism by the speed control means only when the speed control means is in the engine idling position at the time the shifting operation is completed.

6. In a motor driven vehicle, a driving means and a driven means, a clutch mechanism, a multi-step selective transmission system interposed between the driving means and the driven means, said transmission system including shifting means for selecting any one of the several steps of the transmission system whereby the driving ratio between the speed of the driving means and the speed of the driven means may be varied, an operable lever device adapted to be displaced from a released position to a second position by the application of pressure thereto, means to return the lever device to its released position when the pressure is released, clutch operating means including a vacuum operated fluid motor, control means for the clutch operating means operatively connected to the lever device, means for normally maintaining the clutch mechanism engaged when the lever device is in its released position, said selective transmission system including means for initiating a change in the driving ratio between the driving means and driven means thru the transmission system, when the lever device is in its released position by operating only the shifting means, and means for delaying the efficacy of the change until a subsequent operation of the lever device.

7. In a motor driven vehicle, a driving means and a driven means, a clutch and a multi-step selective transmission system interposed between the driving means and the driven means, selector means including a lever device for selecting any of the several steps of the transmission system, an accelerator adapted to be displaced against a returning force from a released position toward a second position to increase the speed of the driving means, clutch operating means, means operating normally to cause the clutch to be engaged to drive the driven means from the driving means, means interposed between the selector means and the clutch operating means to cause the clutch to disengage when the selector means is operated to change from one of the steps of the transmission system to another thereof, and means interposed between the accelerator and the clutch operating means to cause the clutch to engage when the accelerator is first displaced from its released position subsequent to the operation of the selector means.

8. In a motor driven vehicle, a driving means and a driven means, a clutch mechanism, a fluid motor for disengaging the clutch mechanism against a returning force, a multi-step selective transmission system, shifting means for selecting any of the several steps of the transmission system whereby the driving ratio between the driving and driven means may be varied, means cooperating with the shifting means and controlled thereby to operate the fluid motor to disengage the clutch upon operation of the shifting means to select a change in driving ratio between the driving and driven means, means to control the speed of the driving means between idling and rapid rates, and means operating under the control of the speed control means to render the fluid motor inoperative to disengage the clutch prior to a subsequent operation of the shifting means and to cause the returning force acting upon the clutch to become effective to re-engage the clutch subsequent to an operation of the shifting means, said means being operative to cause the clutch to become re-engaged upon a change in the speed control means in the direction between idling and rapid rates and limited in operation to a single time only subsequent to each change in the transmission step selection.

9. In a motor driven vehicle, a driving means and a driven means, a clutch mechanism, a multi-step selective transmission system interposed between the driving means and the driven means, a shifting means including a lever device for selecting any one of the several steps of the transmission system, means operating normally to cause the clutch to be engaged to drive the driven means from the driving means, means operatively connected with the shifting means for operating the clutch mechanism to disengage the clutch upon operation of the shifting means to select one of the transmission steps, means for controlling the speed of the driving means, and means controlled by the speed control means for rendering the means to disengage the clutch mechanism inoperative prior to a subsequent operation of the shifting means so that the clutch is adapted to engage upon an operation of the speed control means subsequent to the operation of the shifting means and once only after each operation of the shifting means.

10. In a motor driven vehicle, a driving means and a driven means, a clutch mechanism, clutch disengaging means including a fluid motor, a multi-step selective transmission system interposed between the driving means and the driven means, said transmission system including a shifting lever for selecting any one of the several steps of the transmission system and to control the operation of the fluid motor to disengage the clutch, accelerator means adapted to be displaced from a released position by the application of force thereupon, means to return the accelerator means to its released position when the force is relieved, means for normally maintaining the clutch mechanism engaged when the accelerator means is in its released position, and means operatively connected to the accelerator means and operative only once subsequent to a change in the transmission step selection to control the period of operation of the fluid motor to disengage the clutch mechanism to cause the clutch mechanism to change from a disengaged to an engaged position.

11. In a motor driven vehicle, a driving means and a driven means, a clutch and a multi-step selective transmission system interposed between the driving means and the driven means, means including a lever device for selecting any of the several steps of the transmission system, speed control means adapted to be depressed against a returning force from a released position to increase the speed of the driving means, clutch operating means including a fluid motor, means controlled by the selecting means and acting upon operation of the lever device to select one of the steps of the transmission system for operating the clutch operating means to disengage the clutch, and means controlled by the speed control means and acting only when the speed control means is in its released position during operation of the selecting means for preventing re-engagement of the clutch mechanism until a subsequent depression of the speed control means.

12. In a motor driven vehicle having a driving means, a driven means, a clutch mechanism, a multi-step selective transmission system, means including a lever device for selecting any of the several steps of the transmission system and speed control means adapted to be displaced from a released position against a returning force to increase the speed of the driving means, in combination, clutch operating means including a motor, means controlled by the selecting means and the speed control means, acting upon operation of the selecting means to select one of the steps of the transmission and effective only when the speed control means is in its released position during operation of the selecting means, for controlling the operation of the clutch operating means to disengage the clutch prior to a shift from one transmission step to another thereof and to prevent re-engagement of the clutch mechanism until subsequent displacement of the speed control means.

13. In a motor vehicle having a driving means, a driven means, a clutch mechanism, a speed control means which is adapted to be displaced from a released position against a returning force to increase the speed of the driving means, and a multi-step selective transmission system including a movable selector device operable to select any of the several steps of the transmission system, in combination, means including a motor for operating the clutch mechanism, means actuated by movement of the selector device to select one of the steps of the transmission system for conditioning the clutch operating means to disengage the clutch, and means controlled by the speed control means, and operable upon disengagement of the clutch mechanism, for holding the clutch mechanism disengaged until a subsequent displacement of the speed control means from its released position in a direction to increase the speed of the vehicle.

14. In a motor driven vehicle having a driving means, a driven means, a clutch mechanism, a speed control means which is adapted to be displaced from a released position against a returning force to increase the speed of the driving means, and a multi-step selective transmission system including a movable selector device operable to select any of the several steps of the transmission system, in combination, means including a motor for operating the clutch mechanism, means actuated by movement of the selector device to select one of the steps of the transmission system for conditioning the clutch operating means to disengage the clutch and means controlled by the speed control means for holding the clutch mechanism disengaged until an initial displacement of the speed control means from its released position subsequent to the completion of the selecting operation.

15. In a motor driven vehicle having a driving means, a driven means, a clutch mechanism, a speed control means which is adapted to be displaced from a released position against a returning force to increase the speed of the driving means, and a multi-step selective transmission system including a movable selector device operable to select any of the several steps of the transmission system, in combination, means including a motor for operating the clutch mechanism, means actuated by movement of the selector device to change from one of the transmission steps to another thereof for conditioning the clutch operating means to disengage the clutch prior to the change from the one transmission step to the other thereof and means connected with the speed control device and adapted to be controlled in accordance with the operation thereof and effective upon disengagement of the clutch mechanism, for holding the clutch mechanism disengaged, said last named means becoming ineffective upon movement of the speed control device from its released position, whereby the clutch is engaged upon movement of the speed control means in a direction to increase the speed of the vehicle.

16. In a motor driven vehicle, a driving means, a driven means, a clutch mechanism and a multi-step selective transmission system interposed between the driving means and the driven means, said transmission system including a shifting means which in operation is adapted to be placed to different predetermined positions for selecting any one of several steps of the transmission system whereby the driving ratio between the speed of the driving means and the speed of the driven means may be varied, a speed control device adapted to be displaced in operation from an initial released position by the application of a displacing force thereupon to increase the speed of the driving means, means to return the speed control device to its initial released position when the applied force is removed, clutch operating means including a power device, control means for the clutch operating means operatively associated with the speed control device, means acting upon a transmission step selecting operation of the shifting means, while the speed control device is in its released position, for initiating a change in the driving ratio between the driving means and the driven means through the transmission system, said control means being releated with the speed control device in such a way that the efficacy of the change in the driving ratio is delayed until a subsequent operation of the speed control device from its released position.

17. In a motor driven vehicle, a driving means, a driven means, a clutch mechanism and a multi-step selective transmission system interposed between the driving means and the driven means, said transmission system including a shifting means which in operation is adapted to be placed to different predetermined positions for selecting any one of several steps of the transmission system whereby the driving ratio between the speed of the driving means and the speed of the driven means may be varied, a speed control device including a lever adapted to be displaced in operation from an initial released position by the application of a displacing force thereupon to increase the speed of the driving means, means to return the lever to its initial released position when the displacing force is removed, clutch operating means including a power device, control means for the clutch operating means operatively associated with the speed control lever, means acting upon a transmission step selecting operation of the shifting means for initiating a change in the driving ratio between the driving means and the driven means through the transmission system, said control means being related with the speed control lever in such a way that the change in driving ratio is effective subsequent to a displacement of the speed control means from its released position despite a completion of the motion of the shifting means to select a transmission step.

18. In a motor driven vehicle, a driving means and a driven means, a clutch mechanism, a multi-step selective transmission system interposed between the driving means and the driven means, said transmission system including shifting means for selecting any one of the several steps of the transmission system whereby the driving ratio between the speed of the driving means and the speed of the driven means may be varied, an operative speed control device including a lever adapted to be displaced from a released position by the application of pressure thereto to increase the speed of the driving means, means to return the lever to its released position when the pressure is released, clutch operating means including a motor, control means for the clutch operating means operative when the speed control lever is in its released position to condition the clutch operating means to disengage the clutch upon operation of the shifting means to select one of the steps of the transmission and to prevent re-engagement of the clutch until a subsequent displacement of the speed control lever from the released position.

19. In a motor driven vehicle having a driving means, a driven means, accelerator means movable from a released position against a returning force for controlling the speed of the driving means, a multi-step transmission gear system between the driving and driven means and a clutch mechanism by which the driving means is adapted to drive the driven means through the multi-step transmission gear system, the combination comprising means for selecting individually any one of the multiple steps of the transmission gear system to control upon completion of the step selection the driving ratio between the driving and driven means, means for initiating automatic operation of the clutch mechanism under the control of the gear selecting means, and means operative upon the initial change only subsequent to a change in gear selection of the accelerator means from a released position to a position to increase the speed of the driving means to cause re-engagement of the clutch to positively drive the driven element from the driving means.

20. In a motor driven vehicle having a driving means, a driven means, a clutch mechanism, a clutch operating means including a motor, a selective transmission system which includes a selector lever device adapted to be displaced from a neutral position to one position to condition the transmission system for reverse operation of the vehicle and from the neutral position to another position to condition the transmission system for forward operation of the vehicle and speed control means adapted to be displaced from a released position against a returning force to increase the speed of the driving means, means controlled by the operable lever device and the speed control means, acting upon displacement of the selector lever device from the neutral position to any one of said transmission conditioning positions and effective only when the speed control means is in its released position during operation of the selector lever device for controlling the operation of the clutch operating means to disengage the clutch prior to the conditioning of the selective transmission system for operation of the vehicle in the desired manner and to prevent re-engagement of the clutch mechanism until a subsequent displacement of the speed control means.

21. In a power plant including an engine, a clutch and a transmission, a pedal in controlling relation with the engine throttle and the clutch and effective to cause only engagement of said clutch, and means adapted to control the operation of the throttle independently of the clutch during driving actuation of said transmission.

22. In a motor driven vehicle, a driving element and a driven element, a multi-step selective transmission system intermediate the driving element and the driven element, said system including a clutch mechanism, a motor for operating the clutch mechanism and means operable to effect a change from one of said steps of the transmission system to another thereof, a pedal in controlling relation with the engine throttle, and means providing a controlling connection between the clutch mechanism and said pedal, said last named means cooperating with said first named means so that the pedal is effective to control the operation of the clutch mechanism only in conjunction with an operation of said first named means.

23. In a motor driven vehicle, a driving element and a driven element, a multi-step selective transmission system intermediate the driving element and the driven element, said system including a clutch mechanism, a motor for operating the clutch mechanism and means cooperating with said clutch mechanism to effect a change from one of said steps of the transmission system to another thereof, a pedal in controlling relation with the engine throttle, and means for establishing a controlling relationship between the pedal and the clutch mechanism, said last named means being arranged so that the pedal is effective for controlling the operation of the clutch mechanism only in conjunction with the operation of said first named means.

24. In a motor driven vehicle, a driving means and a driven means, a multi-step selective transmission system interposed between the driving means and the driven means, said system including a clutch mechanism, a fluid motor for operating the clutch mechanism and selectively operable means acting with said clutch mechanism to change from one of said steps of the transmission system to another one of said steps, a pedal in controlling relation with the engine throttle and the clutch mechanism and effective to cause engagement of the clutch, and means effective upon the operation of said selectivelfy operable means for causing disengagement of said clutch, said pedal being arranged so that its influence upon the disengagement of the clutch is limited to periods of operation of the selective means.

FRANK S. MISTERLY.
SAMUEL B. SMITH.